United States Patent [19]

Pannell

[11] Patent Number: 5,307,645
[45] Date of Patent: *May 3, 1994

[54] AIR CONDITIONING SYSTEM FOR A RECREATIONAL VEHICLE

[76] Inventor: Bobby L. Pannell, P.O. Box 116968, Carrollton, Tex. 75007

[*] Notice: The portion of the term of this patent subsequent to Apr. 27, 2010 has been disclaimed.

[21] Appl. No.: 52,946

[22] Filed: Apr. 23, 1993

Related U.S. Application Data

[63] Continuation-in-part of Ser. No. 724,832, Jul. 2, 1991, Pat. No. 5,205,130.

[51] Int. Cl.⁵ ............................................. B60H 3/04
[52] U.S. Cl. ........................................ 62/244; 62/243; 454/144
[58] Field of Search ............ 62/259.1, 239, 241, 62/243, 244; 454/87, 126, 144, 160, 161

[56] References Cited

U.S. PATENT DOCUMENTS

| | | | |
|---|---|---|---|
| 1,887,224 | 11/1932 | Ward et al. | 62/236 |
| 2,780,077 | 2/1957 | Jacobs | 62/243 |
| 3,007,321 | 11/1961 | Kroyer | 62/199 |
| 3,315,488 | 4/1967 | Lind | 62/259 |
| 3,685,577 | 8/1972 | Goodgion et al. | 165/48 |
| 3,719,058 | 3/1973 | Waygood | 62/200 |
| 3,848,428 | 11/1974 | Rieter | 62/285 |
| 3,855,814 | 12/1974 | Eubank | 62/244 |
| 3,866,433 | 2/1975 | Krug | 62/239 |
| 3,866,439 | 2/1975 | Bussjager et al. | 62/504 |
| 3,885,398 | 5/1975 | Dawkins | 62/89 |
| 3,896,634 | 7/1975 | Nagele et al. | 62/408 |
| 4,105,064 | 8/1978 | Del Toro et al. | 165/29 |
| 4,138,857 | 2/1979 | Dankowski | 62/239 |
| 4,193,271 | 3/1980 | Honigsbaum | 62/180 |
| 4,201,065 | 5/1980 | Griffin | 62/510 |
| 4,353,409 | 10/1982 | Saunders et al. | 165/2 |
| 4,537,117 | 8/1985 | Cavestany et al. | 98/39.1 |
| 4,543,796 | 10/1985 | Han et al. | 62/160 |
| 4,628,702 | 12/1986 | Boxum | 62/244 |
| 4,641,502 | 2/1987 | Aldrich et al. | 62/244 |
| 4,720,983 | 1/1988 | Mintz | 62/259.1 |
| 4,741,178 | 5/1988 | Fujiu et al. | 62/525 |
| 5,056,330 | 10/1991 | Isobe et al. | 62/236 |
| 5,205,130 | 4/1993 | Pannell | 62/236 |

Primary Examiner—Henry A. Bennet
Assistant Examiner—William C. Doerrler
Attorney, Agent, or Firm—Dennis T. Griggs

[57] ABSTRACT

An air conditioning system is disclosed employing a common plenum in which an evaporator airflow passage is formed through an inner side wall and out through a top wall and a condenser airflow passage is formed through a bottom wall and out through an outer side wall. Dual stage operation is provided by a pair of evaporator coils which are interleaved about a common evaporator core, and by a pair of condenser coils which are interleaved about a common condenser core.

9 Claims, 2 Drawing Sheets

AIR CONDITIONING SYSTEM FOR A RECREATIONAL VEHICLE

CROSS-REFERENCE TO RELATED APPLICATION

This is a continuation-in-part of co-pending patent application Ser. No. 07/724,832, filed Jul. 2, 1991, now U.S. Pat. No. 5,205,130.

FIELD OF THE INVENTION

This invention relates generally to air conditioning systems, and in particular to an air conditioning system formed within a compact housing suitable for use in a recreational vehicle.

BACKGROUND OF THE INVENTION

As used herein, the term "recreational vehicle" broadly refers to mobile homes, motor homes, travel trailers, fifth wheelers, recreational vans and the like. Air refrigeration and conditioning may be provided by a compressor/condenser/evaporator unit mounted internally or externally of such vehicles. The air conditioning unit for some recreational vehicles is mounted on the roof of the vehicle. An opening is made in the roof for delivering conditioned air from the evaporator coil of the air conditioner to the interior of the vehicle. Other recreational vehicles have a window mounted air conditioner unit or an internal floor mounted evaporator console with an external compressor/condenser.

The recreational van is a multiple purpose vehicle which is especially popular among couples and families with small children. It makes an excellent camping rig for weekends and short vacations. To overcome rising construction costs and fuel costs, the trend in van construction has been toward smaller van body sizes. Accordingly, the location and space for an air conditioning unit must be carefully planned and allocated in the construction of modern recreational vehicles.

DESCRIPTION OF THE PRIOR ART

Conventional recreational vehicles have an air conditioning system which is powered by an on-board auxiliary AC power generator. A power cable is provided for conducting AC operating power to the compressor/fan components from a commercial utility outlet when it is available. The current rating of the on-board AC power generator is sufficient to power the air conditioning system during travel, and when parked if commercial utility power is not available.

The capacity of conventional, single stage air conditioning systems is adequate under certain operating conditions, for example during early spring and late fall, but may not be adequate to provide comfortable air conditioning throughout most of the United States during the hot summer months. It is theoretically possible to install a large capacity air conditioning system and an on-board power generator to provide adequate cooling during the entire summer season. However, because of space limitations, it has not been practical to install an auxiliary AC power generator having the KVA rating necessary to supply the higher operating power levels required by such large capacity compressors. Moreover, the space occupied by the large capacity compressor/condenser/evaporator unit displaces an unacceptable amount of living/storage space within the vehicle.

Consequently, conventional recreational vehicles carry only a single air conditioning compressor/evaporator/condenser unit which is powered from an on-board auxiliary AC power generator, or alternatively by available commercial utility power. In such recreational vehicles, the air conditioning units are operated at their rated BTU output level, even when connected to commercial utility power which could support operation at a higher, more comfortable operating level.

SUMMARY OF THE INVENTION

The present invention discloses an air conditioning system employing a compact housing or plenum wherein the components are compactly arranged for installation in an equipment compartment beneath the floor of a recreational vehicle. Dual stage operation is provided by dual compressors, a pair of evaporator coils which are interleaved within a common evaporator unit, and by a pair of condenser coils which are interleaved within a common condenser unit. Outside air is drawn through an outer sidewall, directed across the interleaved condenser coils, and exhausted out a bottom wall into the atmosphere. Return air from within the recreational vehicle is circulated through a return duct through an inner side wall, directed across the interleaved evaporator coils, and exhausted up through a discharge port formed through the top wall and back into the vehicle. A condenser fan draws the outside air through the side of the vehicle and passes the air over the compressors and through the condenser unit to cool the refrigerant flowing from the evaporator unit. The heated air is exhausted into the atmosphere through the bottom wall. An evaporator fan is disposed adjacent the evaporator unit and is enclosed by a fan housing forming an integral airflow passage extending to and shrouding the evaporator unit. The evaporator fan draws the internal air from within the recreational vehicle through the evaporator unit, for chilling the air and exhausts the chilled air through the discharge port formed as part of the fan housing and extending through the top wall.

ADVANTAGES OF THE INVENTION

The present invention provides a compact and efficient housing (plenum) for a dual stage air conditioning system for use in a recreational vehicle in which the compressors, evaporators, condensers and other refrigerant/airflow components are efficiently arranged for space savings and for improved performance. The plenum is easily constructed and fitted to existing recreational vehicles.

Operational features and advantages of the present invention will be understood by those skilled in the art upon reading the detailed description which follows with reference to the attached drawings.

BRIEF DESCRIPTION OF THE DRAWINGS

Referring now to the drawings in which like reference numerals and letters indicate corresponding elements throughout the several views.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the spirit and the scope of the present invention.

Figure 1:
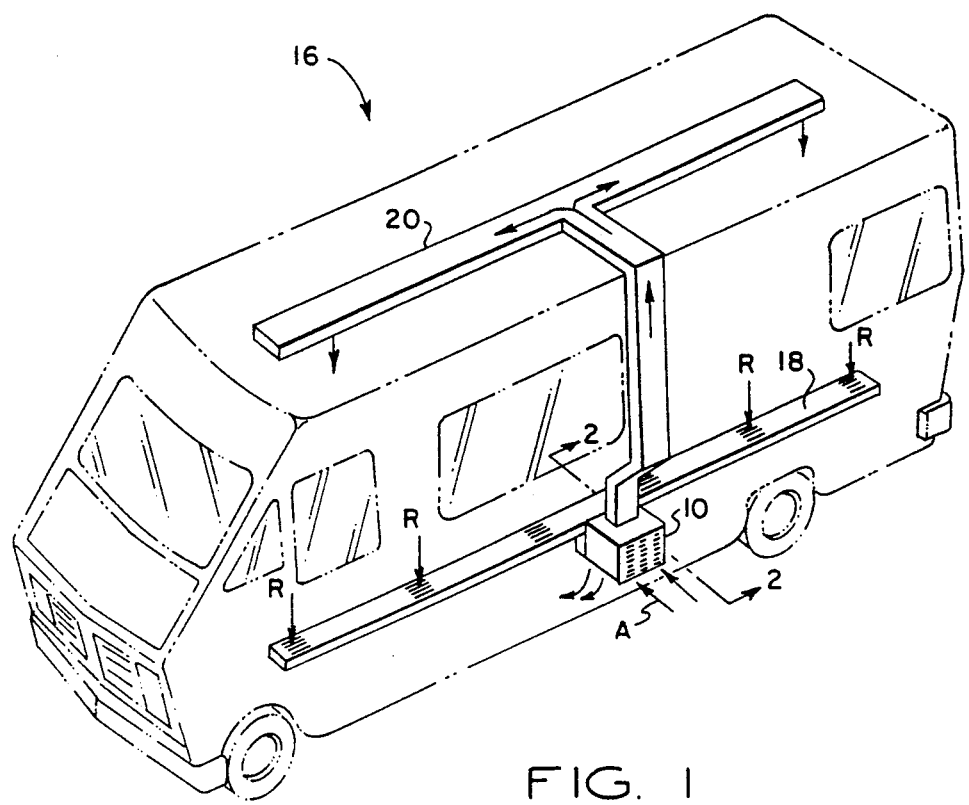
FIG. 1 is a perspective view of a recreational vehicle with an air conditioning system practiced in accordance with the principles of the present invention.
Figure 2:
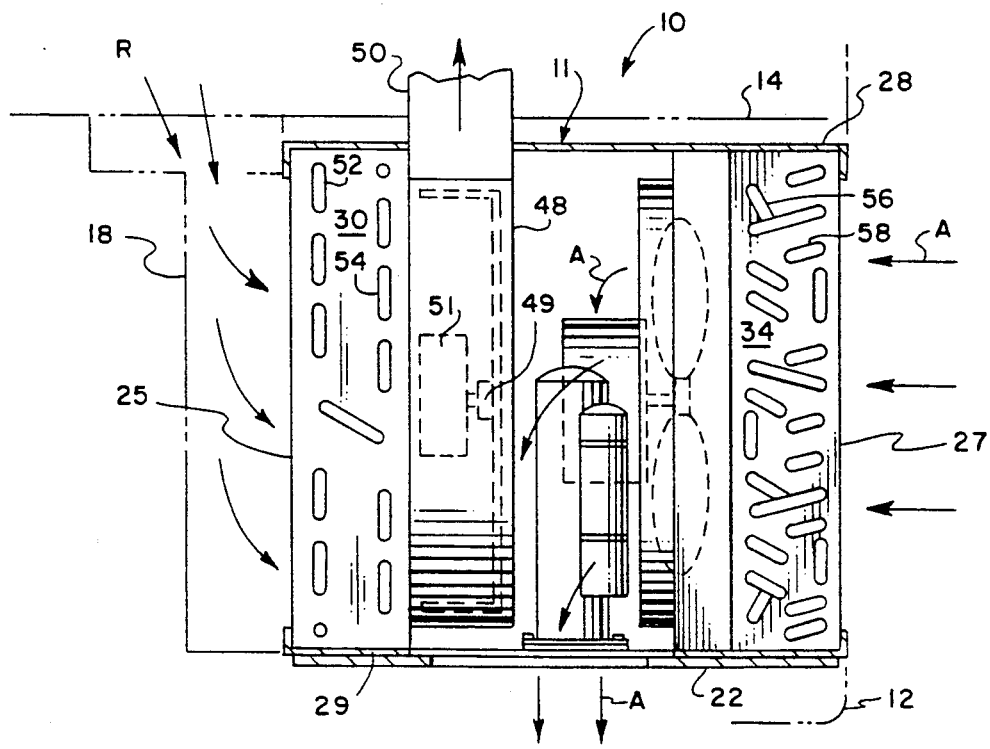
FIG. 2 is a sectional view of the air conditioning system taken along the line 2—2 in FIG. 1.

Referring now to FIGS. 1 and 2, a dual stage air conditioning unit 10 is installed within an equipment compartment 12 beneath the floor 14 of a recreational vehicle 16. The air conditioning unit 10 circulates refrigerated air into and out of the interior air space of the recreational vehicle 16 through a return air duct 18 disposed near the floor and an overhead ceiling distribution duct 20 respectively.

Figure 3:
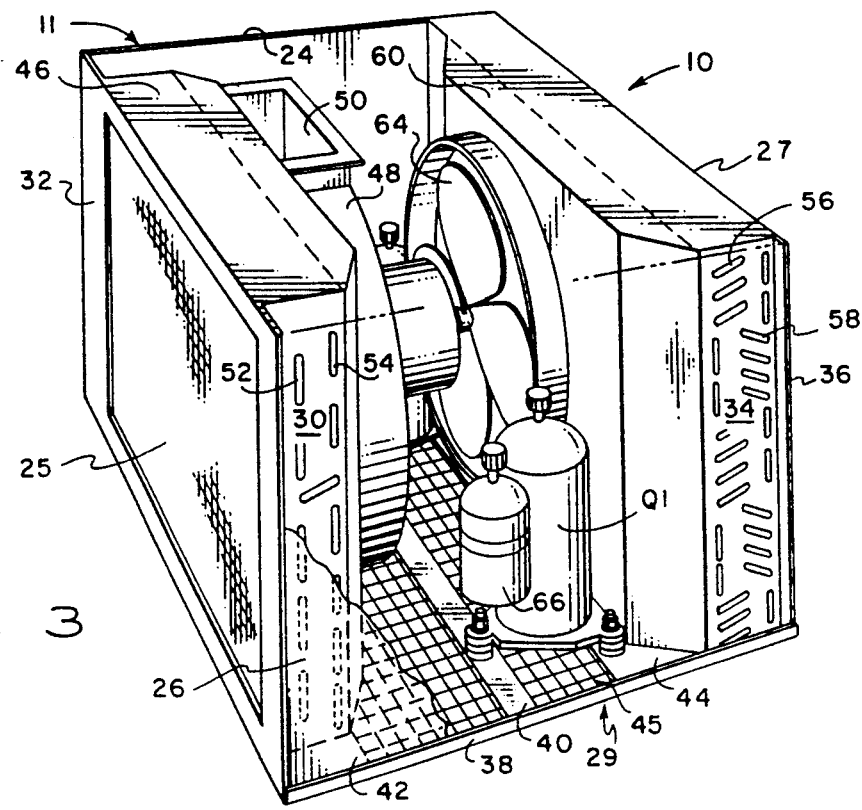
FIG. 3 is a perspective view of the air conditioning unit shown in FIG. 1 with one of the end walls partially broken away and the top wall completely removed; and, FIG. 4 is a simplified refrigerant schematic diagram of the refrigeration system practiced in accordance with the principles of the present invention.

Referring now to FIGS. 2 and 3, the components of the dual stage air conditioning unit 10 are assembled within a housing plenum 11 mounted beneath the vehicle floor 14 on a support panel 22. The plenum 11 is preferably made of galvanized sheet steel and is defined by a first closed end wall 24, a second closed end wall 26 (partially shown in FIG. 3), a return air intake side wall 25, an ambient air intake side wall 27, a partially enclosed top wall 28, and an air exhaust bottom wall 29. The inner side wall 25 is formed by an evaporator unit 30 juxtaposed against a first frame opening 32 which borders the periphery of the evaporator unit 30 for providing support but allowing return air flow from within the recreational vehicle 16 therethrough. The outer side wall 27 is formed in part by a condenser unit 34 juxtaposed against a second frame opening 36 which boarders the periphery of the condenser unit 34 for providing support but allowing inlet flow of ambient air for the atmosphere therethrough. The bottom wall 29 is formed in part by a third frame opening 38 for providing support but allowing air to be discharged therethrough. The third frame opening 38 further includes a center member 40, an inner side wall flange 42, an outer side wall flange 44, and a screen 45 for keeping large objects from passing therethrough.

Disposed adjacent and against the inner air passage side wall 25 is the return air duct 18. The return air duct 18 conducts return air R from the interior of the recreational vehicle 16 across the evaporator unit 30. An evaporator shroud 46 forms an airflow passage for directing the return air R from the return air duct 18 through the evaporator unit 30 into a fan cover 48. The evaporator shroud 46 is preferably tapered and integrally formed as part of the fan cover 48 so that the air passing through the evaporator unit 30 is concentrated into a narrow air stream. The fan cover 48 encapsulates an evaporator fan 49 (FIG. 4) having a squirrel cage impeller 51 which induces the return air R to flow through the evaporator unit 30. The air flow directed through the fan cover 48 is discharged upwardly through a discharge port 50 integrally formed as the top of the fan cover 48. The discharge port 50 is fitted through an opening in the top wall 28 and is operatively coupled to the overhead ceiling distribution duct 20.

The evaporator unit 30 in the preferred embodiment, includes a first and second interleaved evaporator refrigerant coil 52 and 54 respectively, which are supported transversely across the evaporator air passage formed by the evaporator shroud 46. According to this arrangement, the heat load carried by the return air R from the interior of the recreational vehicle 16 is absorbed by refrigerant vapor as it expands through the evaporator coils 52 and 54. The heat load absorbed by the refrigerant in the interleaved evaporator coils 52 and 54 is exchanged into the surrounding ambient outside air A by the condenser unit 34.

The condenser unit 34 includes a first and a second condenser coil 56 and 58 respectively, which are supported transversely across an air passage defined by a condenser shroud 60. The condenser shroud 60 is juxtaposed against the condenser unit 34 and is preferably tapered so as to concentrate the airflow induced through the bottom wall 29 through the condenser unit 34. A condenser fan 62 is mounted in front of the air passage defined by the condenser shroud 60 and along the center member 40. The condenser fan 62 has a fan blade 64 for drawing the outside atmosphere air A through the side wall 27, across the compressors $Q_1$ and $Q_2$, and through the condenser unit 34. The fan blade 64 forces the outside air A to flow in heat exchange contact across the interleaved condenser coils 56 and 58 and to exit the bottom wall 29 into the airspace below the vehicle. It should be understood that by interleaving the condenser coils 56 and 58 about a common finned core and by interleaving the evaporator coils 52 and 54 about a common finned core, a single condenser fan 62 can be employed for circulating the ambient air A across the condenser coils 56 and 58, and a single evaporator fan 49 can be employed to draw return air R across the evaporator coils 52 and 54 respectively.

Figure 4:
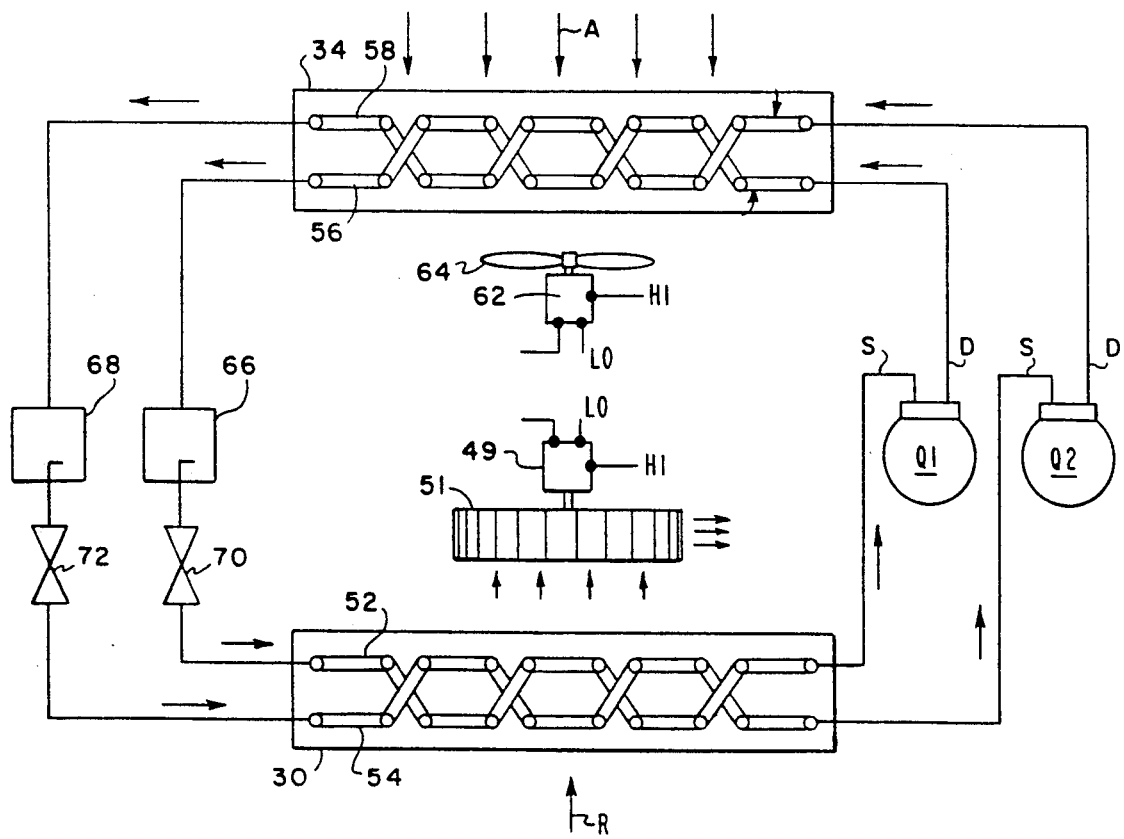

Referring now to FIG. 4, a first stage compressor $Q_1$, has a suction port S coupled in a series refrigerant flow relation with the first evaporator coil 52, and has a discharge port D connected in a series flow relation with the first condenser coil 56. Similarly, a second stage compressor $Q_2$, has a suction port S coupled in a series flow relation with the second evaporator coil 54, and has an discharge port D coupled in a series flow relation with the second condenser coil 58. As the refrigerant condenses within the condenser coils 56 and 58, it is collected within a first and a second receiver 66 and 68, respectively.

The receivers 66 and 68 each are connected in a series flow relation with the evaporator coils 52 and 54, respectively, by first and second expansion devices 70 and 72, respectively. The expansion devices may be valves or capillary tubes. Each expansion device 70 and 72 functions as a throttling device to meter the flow of liquid refrigerant through the evaporator coils 52 and 54. Each evaporator coil 52 and 54 includes a series of bends or loops through which the refrigerant makes multiple passes through a common finned core. The temperature and pressure of the refrigerant decreases as it is discharged through the respective expansion valve. The decreased pressure and temperature due to expansion, coupled with the heat transfer from the return air A, causes the refrigerant to evaporate. The vapor refrigerant flows to the suction sides of each compressor $Q_1$ and $Q_2$, where the vapor is compressed to continue the refrigeration cycle.

The foregoing description of the preferred embodiment of the present invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

I claim:

1. An air conditioning system for installation in a recreational vehicle comprising:
   a housing defined by a top wall, a ventilated bottom wall, a first and a second end wall, an inner side wall, and an outer side wall, the inner side wall being formed in part by an evaporator unit having a first support frame peripherally disposed thereabout, the outer side wall being formed in part by a condenser unit having a second support frame peripherally disposed thereabout, the bottom wall being formed in part by a screen having a third frame peripherally disposed thereabout, a central member spanning between the first and the second end walls, and an inner and an outer side wall flange;
   a refrigeration stage disposed along the central member and coupled between the evaporator unit and the condenser unit;
   a condenser fan disposed along the central member, for drawing atmospheric air through the side wall and passing the air through the condenser unit for discharge through the bottom wall;
   a fan housing disposed adjacent and abutting the evaporator unit and forming an airflow passage therebetween; and,
   an evaporator fan, disposed within the fan housing, for drawing return air through the evaporator unit and discharging the air out through a discharge port formed in a top section of the fan housing extending through the top wall.

2. An air conditioning system as recited in claim 1 wherein the airflow passage formed by the fan housing is tapered towards the evaporator fan.

3. An air conditioning system as recited in claim 1 further including a condenser shroud, disposed adjacent the condenser unit and extending towards the condenser fan, for forming an airflow passage between the condenser fan and the condenser unit.

4. An air conditioning system as recited in claim 3 wherein the shroud is tapered towards the condenser unit.

5. An air conditioning system as recited in claim 1 wherein the evaporator unit includes a first and a second interleaved evaporator coil and wherein the condenser unit includes a first and a second interleaved condenser coil.

6. An air conditioning system as recited in claim 5 wherein the refrigeration stage includes a first and a second refrigerant compressor and a first and a second refrigerant expansion valve, the first compressor, the first condenser coil, the first refrigerant expansion valve, and the first evaporator coil being serially connected in a first refrigeration circuit, and the second compressor, the second condenser coil, the second refrigerant expansion valve and the second evaporator coil being serially connected in a second refrigeration circuit.

7. A compact air conditioning unit for installation in a recreational vehicle comprising, in combination:
   a plenum defined by a top wall, a substantially open bottom wall, first and second ends walls, an inner side wall formed by dual interleaved evaporator coils, and an outer side wall formed by dual interleaved condenser coils;
   refrigeration means, coupled between the evaporator unit and the condenser unit, for exchanging heat therebetween;
   a fan housing disposed adjacent the evaporator coils and defining an evaporator air passage therethrough, the fan housing having a top portion forming a discharge port;
   an evaporator fan disposed within the fan housing for drawing air across the evaporator coils and out the discharge port; and
   a condenser fan, disposed along the bottom wall and adjacent the condenser unit, for drawing ambient air across the condenser coils.

8. A compact air conditioning unit as recited in claim 7 wherein the evaporator fan includes a squirrel cage impeller.

9. A recreational vehicle of a type having an interior living space to be cooled by circulation of refrigerated air through a distribution duct and having an on-board AC power generator and a power cable connectable to an external utility power outlet for supplying electrical operating power to an on-board air conditioning system, comprising:
   a dual stage air conditioning unit being enclosed within a plenum, the plenum being mounted below a floor of the recreational vehicle and adjacent to a side wall within the vehicle, the plenum defined by a bottom wall, a first and a second end wall, a top wall, an inner side wall interconnected with a return air duct disposed near the floor and forming an evaporator airflow passage therebetween, and an outer side wall forming a condenser airflow passage for admitting ambient air;
   the bottom wall having an opening defining an outside air discharge port in airflow communication with the condenser airflow passage for exhausting air into the airspace below the vehicle;
   the top wall having an opening defining a discharge port in airflow communication with the evaporator airflow passage and connecting the evaporator airflow passage in airflow communication with the interior living space of the vehicle;
   a condenser unit including a first and a second interleaved condenser coil disposed across the condenser airflow passage;
   an evaporator unit including a first and a second interleaved evaporator coil disposed across the evaporator airflow passage;
   a first compressor having a suction port coupled in a series flow relation with the first evaporator coil, and having an outlet port connected in a series flow relation with the first condenser coil;
   a second compressor having a suction port coupled in a series flow relation with the second evaporator coil, and having an outlet port connected in a series flow relation with the second condensor coil;
   a first refrigerant expansion device coupled in a series flow relation between the outlet of the first condenser coil and the inlet of the first evaporator coil;
   a second refrigerant expansion device coupled in a series flow relation between the outlet of the second condenser coil and the inlet of the second evaporator coil;

a condenser fan disposed along the bottom walls and within the condenser airflow passage for drawing outside ambient air through the inlet port and forcing it to flow in heat exchange contact across the interleaved condenser coils; and, an evaporator fan disposed within the evaporator airflow passage for drawing air from the interior living space of the recreational vehicle through the return air inlet port and causing it to flow in heat exchange contact across the interleaved evaporator coils and through the refrigerated air distribution duct.

* * * * *